_United States Patent_ [19]

Lee

[11] Patent Number: 5,046,789

[45] Date of Patent: Sep. 10, 1991

[54] MODULAR PANEL ASSEMBLY

[75] Inventor: Yeou-Ching Lee, Taipei City, Taiwan

[73] Assignee: Alvin Lee Jewelry, Inc., Taipei, Taiwan

[21] Appl. No.: 505,232

[22] Filed: Apr. 5, 1990

[51] Int. Cl.⁵ ............................................ A47B 87/00
[52] U.S. Cl. .................................. 312/108; 52/27 D; 52/284
[58] Field of Search ............... 312/108, 111, 140, 263, 312/265.6; 220/4 F; 52/270, 284

[56] References Cited

U.S. PATENT DOCUMENTS

| | | | |
|---|---|---|---|
| 3,427,669 | 2/1969 | Swenson | 312/263 |
| 3,450,293 | 6/1969 | Seda | 220/4 F |
| 3,552,817 | 1/1971 | Marcolongo | 312/111 |

FOREIGN PATENT DOCUMENTS

2225347  12/1974  France ................................ 220/4 F

Primary Examiner—Kenneth J. Dorner
Assistant Examiner—Gerald A. Anderson
Attorney, Agent, or Firm—Cushman, Darby & Cushman

[57] ABSTRACT

A modular panel assembly includes more than one first modular unit having a plate member with a rear face, which has first and second connecting corner pieces longitudinally and oppositely disposed near the side faces. The first connecting corner piece of each of the first modular units is engageable with the second connecting corner piece of another first modular unit. The first modular unit further has a plurality of substantially T-shaped protrusions projecting from a front face of the plate member and forming a plurality of substantially T-shaped grooves between them. Each of the T-shaped protrusions has a pair of oppositely extending flange ends. Each of the T-shaped grooves has a restricted opening between two flange ends. The T-shaped protrusions of each first modular unit can engage with the T-shaped grooves of another first modular unit.

3 Claims, 12 Drawing Sheets

MODULAR PANEL ASSEMBLY

BACKGROUND OF THE INVENTION

This invention relates to a modular panel assembly; more particularly to a modular panel assembly which comprises a plurality of interlocking modular units The objective of this invention is to provide a modular panel assembly having a plurality of interlocking modular units of varying structures which can be assembled to form different multi-functional casings.

SUMMARY OF THE INVENTION

Accordingly, the preferred embodiment of a modular panel assembly according to this invention comprises more than one first modular unit, each of which has a plate member. The rear face of the plate member has a first and a second connecting corner piece longitudinally and oppositely disposed near the side faces. The first connecting corner piece of each of the first modular units is engageable with the second connecting corner piece of another first modular unit. The first modular unit further has plurality of a substantially T-shaped protrusions projecting from a front face of the plate member and forming a plurality of substantially T-shaped grooves between them. Each of the T-shaped protrusions has a pair of oppositely extending flange ends. Each of the T-shaped grooves has a restricted opening between two flange ends. The T-shaped protrusions of each of the first modular units are engageable with the T-shaped grooves of another first modular unit. Each of the first modular units has two longitudinal side grooves, oppositely formed at the side faces, and two pairs of flanks, each pair defining one of the side grooves. One of the flanks in each pair is longer than the other flank, and one of the flanks in each pair is adjacent to the rear face and has an inclined edge face. The first and second connecting corner pieces have an extreme lower end which projects downward from the bottom edge of the plate member and an extreme top end spaced from the top edge of the plate member.

When two of the first modular units are interlocked, a sectoral plate can be seated on the extreme top ends of the first and second connecting corner pieces to form a display stand.

The modular panel assembly further comprises a second modular unit, which is provided at the bottom of a rectangular hollow housing formed by interlocking four first modular units. The second modular unit has a closed bottom, a rectangular looped frame and corner sockets adjacent to the looped frame for engaging with the hollow housing.

A third modular unit, which is received at a top end of the hollow housing, has a second looped frame with a plurality of intersecting partitioning members formed therein to constitute a plurality of access openings for the hollow housing.

A fourth modular unit has a plate with a rear face having at least one substantially T-shaped longitudinal projection to be received by one of the T-shaped grooves of the first modular unit. The plate can be irregular in shape and formed as a decorative figure.

The modular panel assembly further comprises a picture frame having a pair of longitudinally opposed T-shaped protrusions for attachment with the first modular unit. The picture frame further has a peripheral retaining member for supporting a picture.

A sixth modular unit of the modular panel assembly has a segmented cylindrical wall with a third and a fourth longitudinal connecting corner piece identical in construction to the first and second connecting corner pieces of the first modular unit. A plurality of sixth modular units is assembled with the first modular units to form a cylindrical hollow housing.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENTS

To simplify the illustration of the embodiments, like numerals are employed for like elements throughout the drawings.

Referring to FIGS. 1A, 1B, 1C, 2, the preferred embodiment of a first modular unit 1 according to this invention comprises a plate member 11 with a plurality of substantially T-shaped protrusions 101 projecting from a front face of the plate member 11. A substantially T-shaped groove 102 is thus formed between two T-shaped protrusions 101. The T-shaped grooves 102 are open at the top and the bottom edges of the plate member 11. The first modular unit 1 has first and second longitudinal connecting corner pieces 110, 111 formed near the side faces of the plate member 11 on the rear face of the same. The extreme top ends of the first and second connecting corner pieces 110, 111 are spaced from the top edge of the plate member 11. The first and second connecting corner pieces 110, 111, however, each have an extreme lower end extending downward from the bottom edge of the plate member 11. The first connecting corner piece 110 has a longitudinal groove 1101. The second connecting corner piece 111 has a longitudinal tongue 1111. The first and second connecting corner pieces 110, 111 are used for interlocking two first modular panels 1, which incline with one another to form a right angle therebetween.

Referring again to FIGS. 1A, 2, four first modular units 1 are interlocked to form a hollow rectangular housing. The longitudinal tongue 1111 of the second connecting corner piece 111 of one of the first modular units 1 is received by the longitudinal groove 1101 of the first connecting corner piece 110 of a second first modular unit. Each first modular panel 1 has two opposing longitudinal side grooves 103, 104 at the two side faces. The first side groove 103 is defined by a first rear flank 105 and a first front flank 106. The first rear flank 105 has an inclined edge face and a length relatively longer than that of the first front flank 106. The second side groove 104 has a second rear flank 107 with an inclined edge face and a second front flank 108. The second front flank 108 is longer than the second rear flank 107. The inclined faces of the first and second rear flanks 105, 107 have an inclination of 45 degrees relative to the rear face of the first modular unit 1. When the first and the second connecting corner pieces 110, 111 are interlocked, the plate members 11 cooperate to form a right angled corner 112. The first rear flank 105 of one first modular unit 1 abuts with the second rear flank 107 of another first modular unit 1. The resulting housing of FIG. 2 can be used as a toothbrush and toothpaste tube holder.

Figure 3:
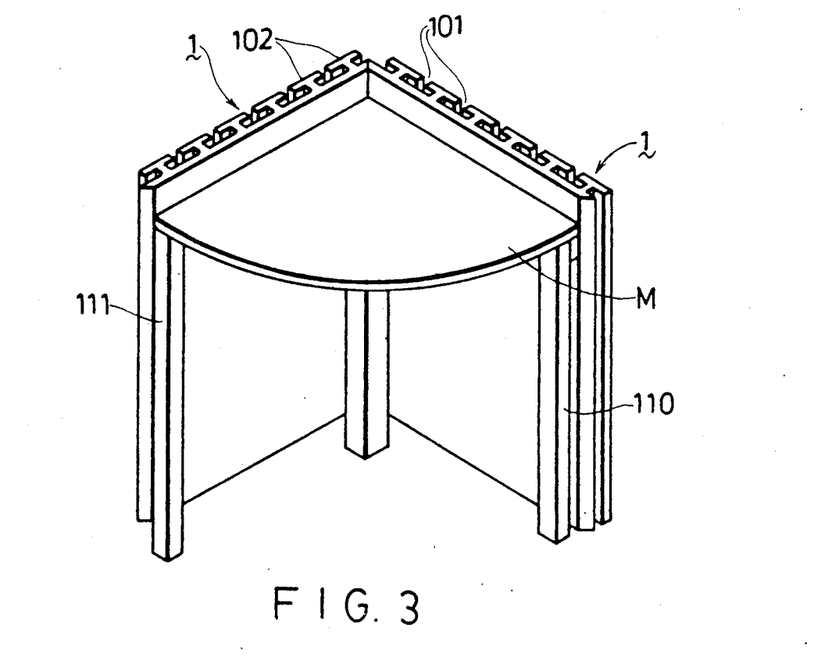
FIG. 3 is a display stand formed by seating a sectoral plate on top of an interlocked pair of first modular units.

Referring to FIG. 3, a pair of first modular units 1 are interlocked and a sectoral panel M is seated on the extreme top ends of the first and second connecting corner pieces 110, 111 of the modular units 1. The resulting structure, as shown in this FIG., can thus be placed in a corner and serve as a display stand.

Figure 4A:
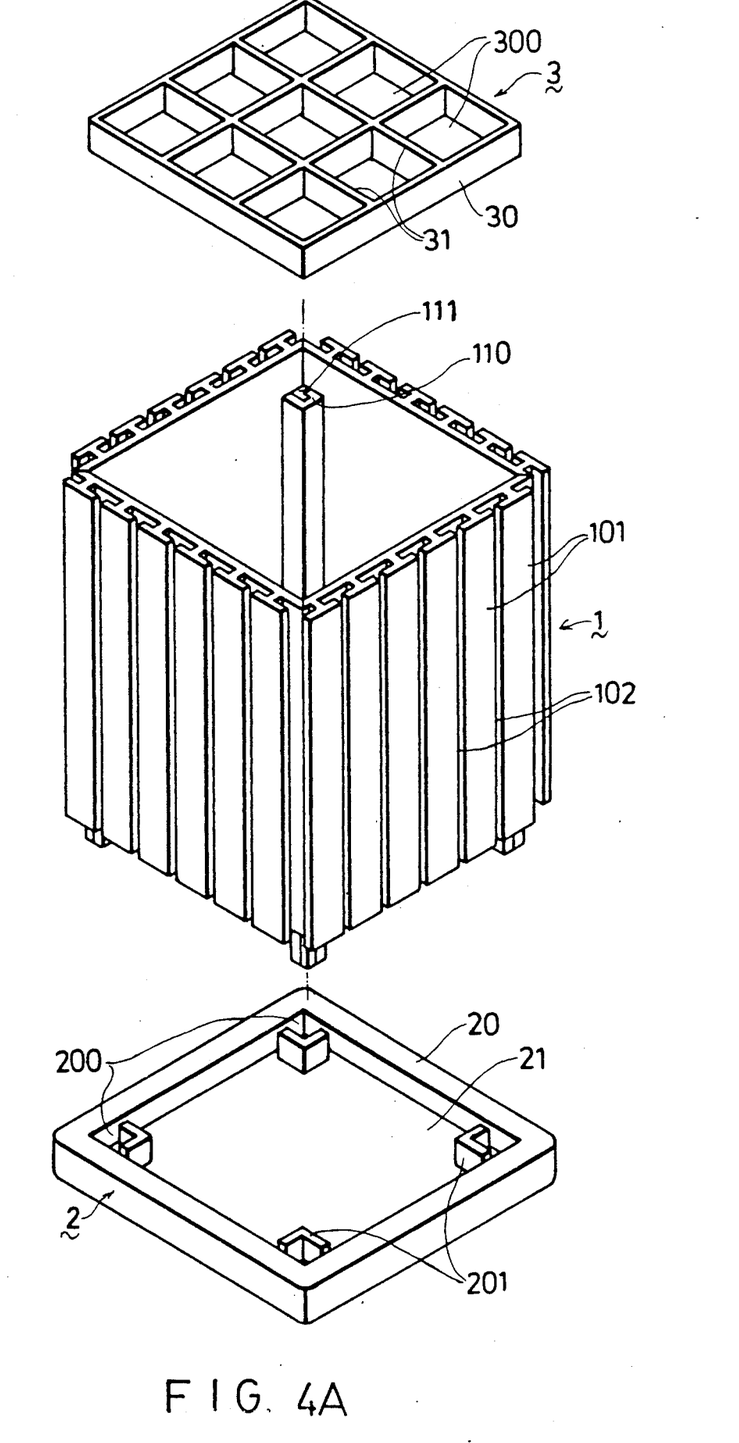
FIGS. 4B are exploded and assembled views of a rectangular container using a second and a third modular unit according to this invention.

Second and third modular units 2, 3 are shown in FIG. 4A. The second modular unit 2 has a closed bottom and a rectangular looped frame 20 confining a rectangular recess 21. The second modular unit 2 further has four L-shaped members 201 at each corner of the rectangular recess 21. Each of the L-shaped members 201 cooperates with the looped frame 20 to form a corner socket 200.

Figure 4B:
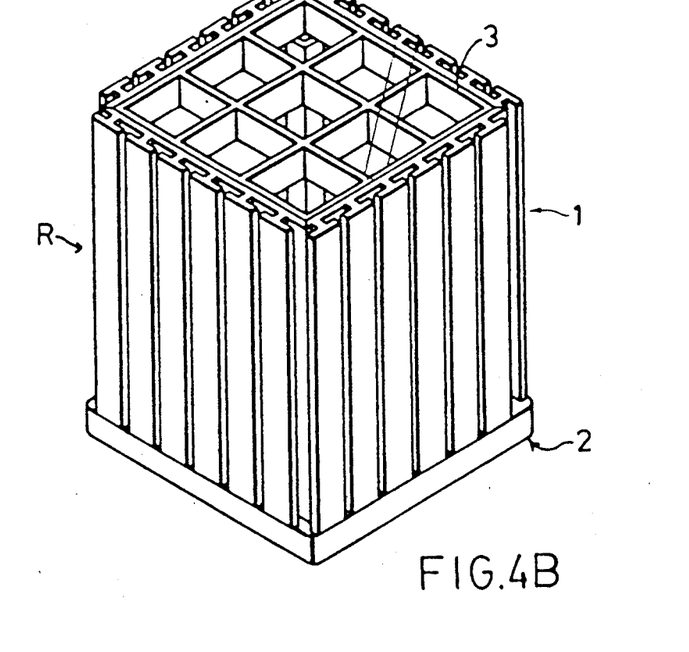

The third modular unit 3 has a rectangular looped frame 30 with a plurality of intersecting partitioning frames 31 provided therein to form a plurality of access openings 300. Referring to FIG. 4B, the third modular unit 3 is received at a top end of the housing of FIG. 2, while the interlocked first and second connecting corner pieces 110, 111 of the first modular units 1 are received by the corner sockets 200 of the second modular unit 2. The resulting container R can be used as a pencil holder as shown in this FIG..

Figure 5A:
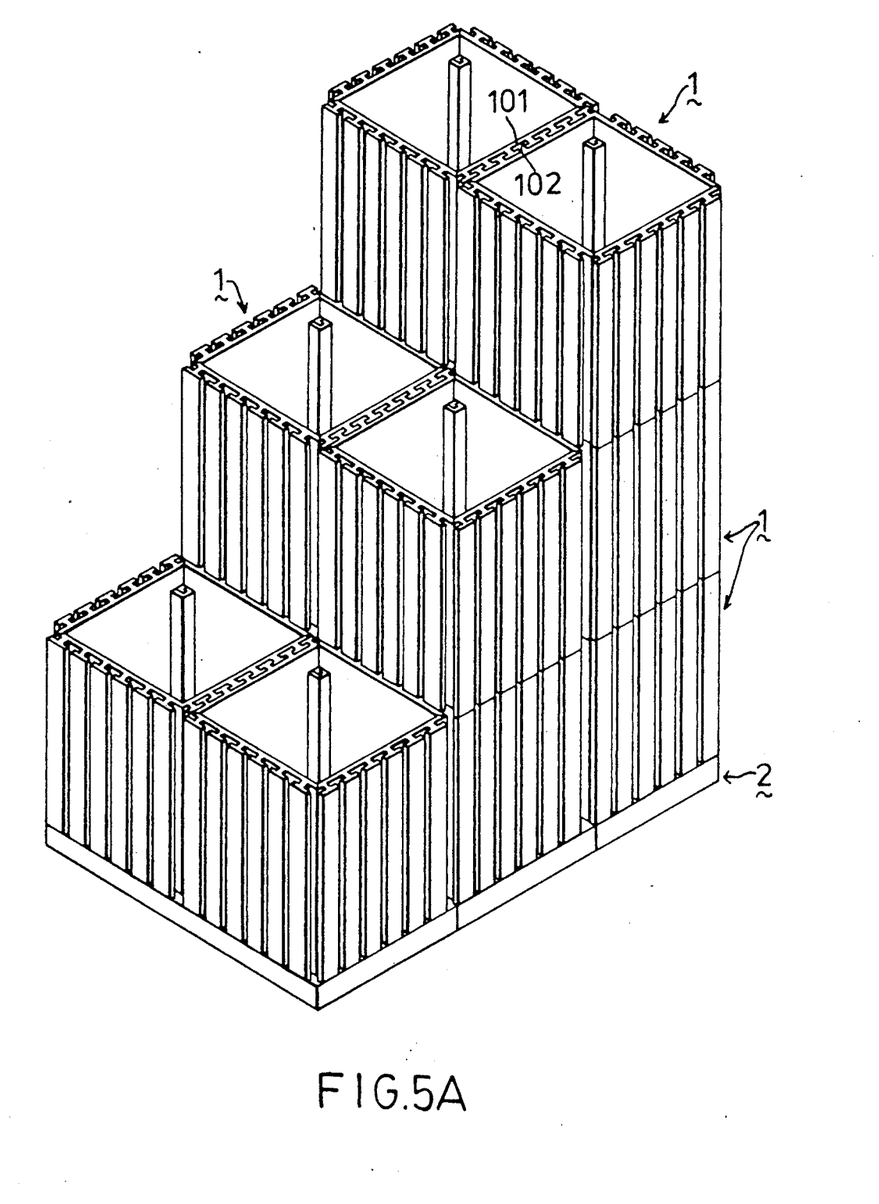
FIG. 5A is a perspective view of a plurality of rectangular c stacked on top of each other.
Figure 5B:
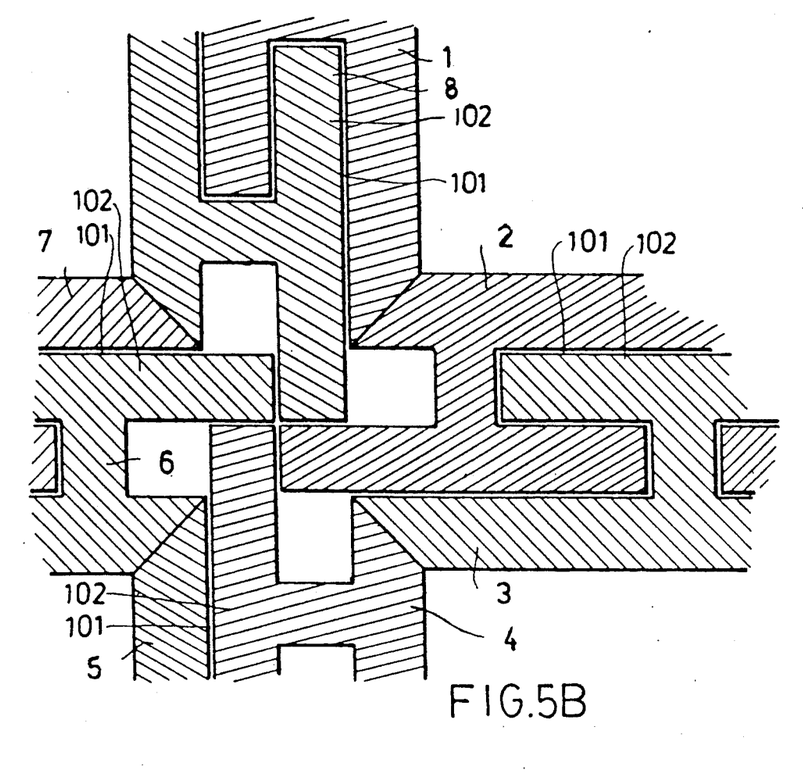
FIG. 5B illustrates the method of joining the stacked rectangular containers of FIG. 5A.
Figure 6A:
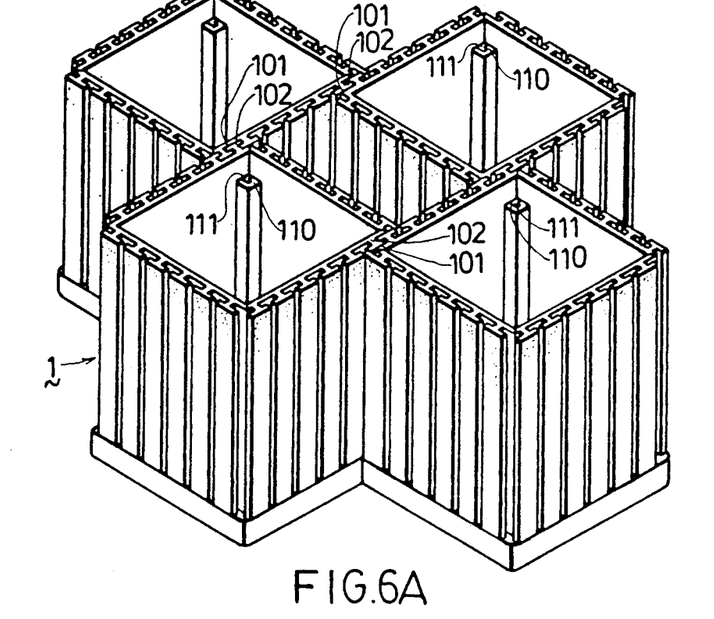
FIGS. 6A, 6C, 6D illustrate other means of joining a plurality of rectangular containers.
Figure 6B:
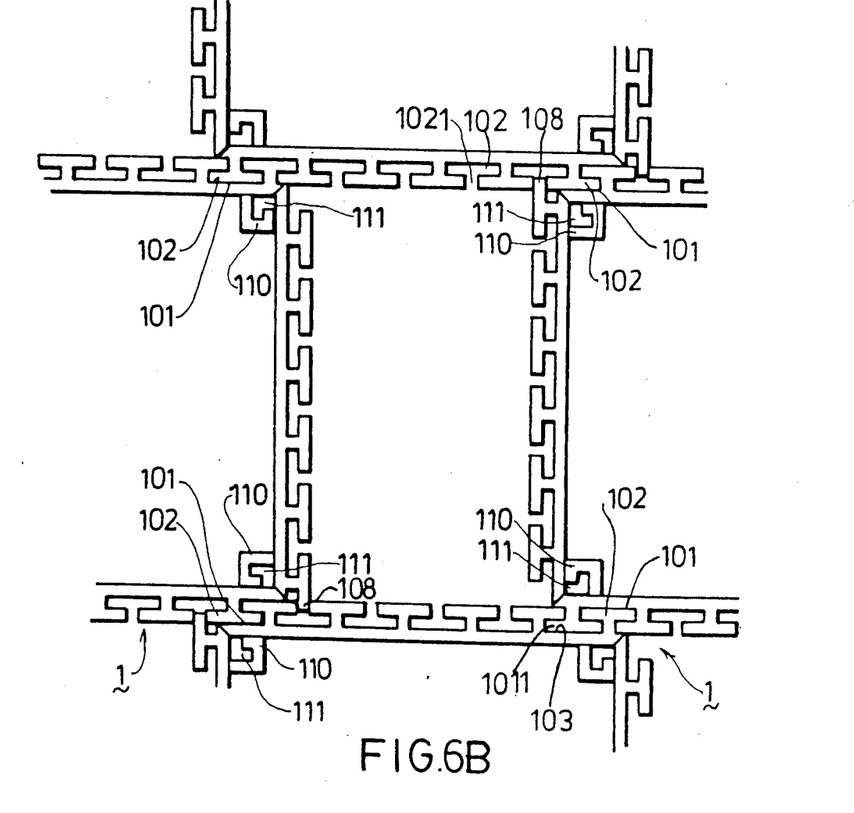
FIG. 6B illustrates the method of joining of the rectangular containers of FIG. 6A.
Figure 6C:
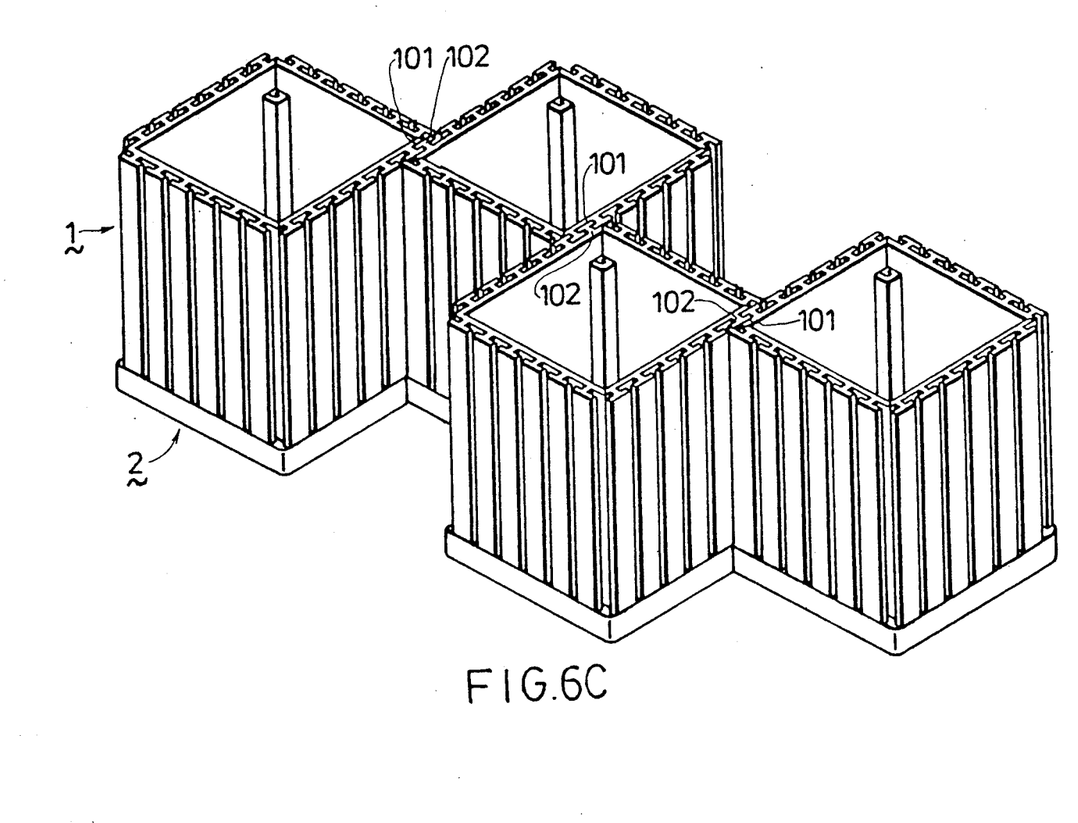
Figure 6D:
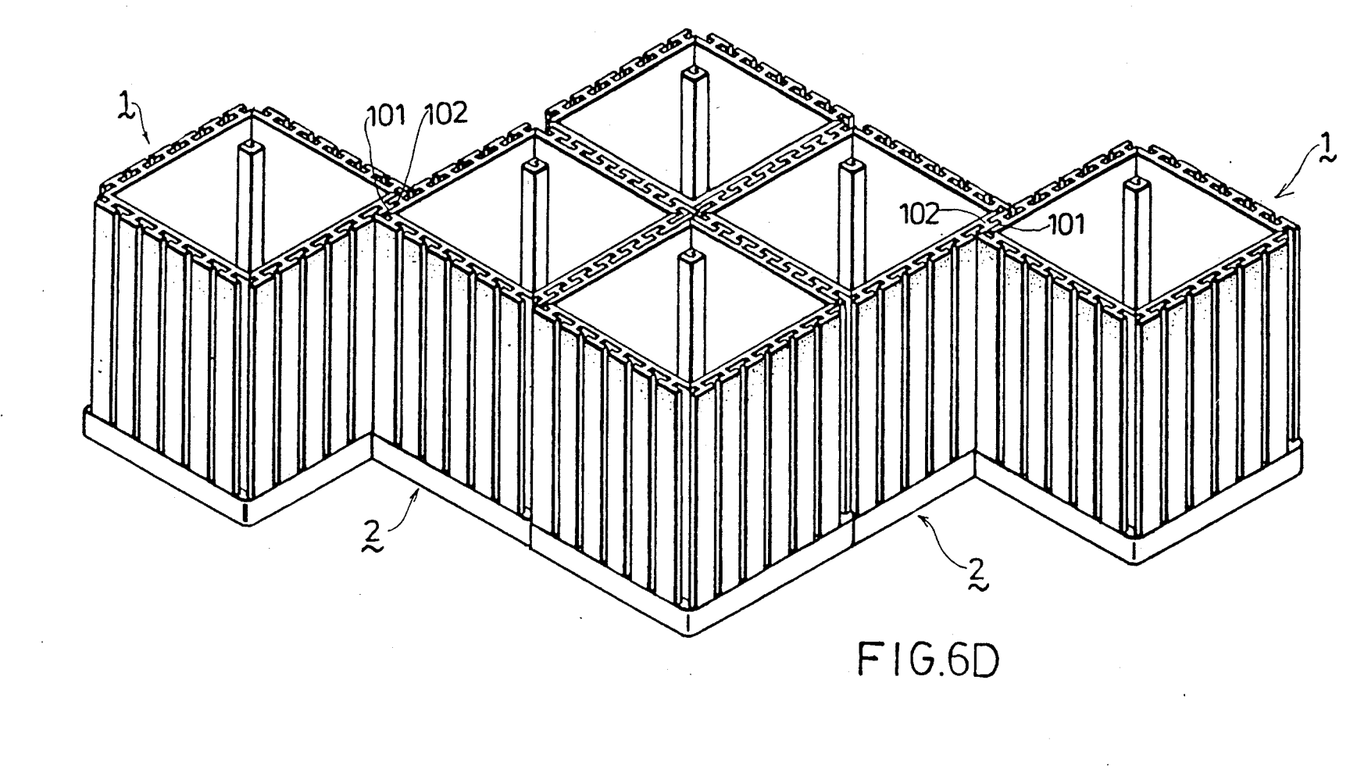

The resulting container R of FIG. 4B can be stacked on one another (as shown in FIG. 5A) or joined with other containers R to form different figures (as shown in FIGS. 6A, 6C, 6D). Referring to FIG. 6B, which shows the assembly of the containers R of FIG. 6A, two adjacent first modular units 1 are interconnected side by side by the engagement of the first side groove 103 of one first modular unit 1 with a flange end 1011 of one of the T-shaped protrusions 101 of the other first modular unit 1. Another two adjacent first modular units 1 are inclined relative to one another at an angle of 90 degrees, and are interconnected by the first and second connecting corner pieces 110, 111. The second front flank 108 of the first modular units 1 can be fitted in a restricted opening 1021 of one T-shaped groove 102 of another first modular panel 1, which is perpendicular thereto. Referring to FIG. 5B, which shows the assembly of the containers R of FIG. 5A, eight first modular panels 1 are interlocked to form a cross-shaped assembly. The T-shaped protrusions 101 of one first modular panel 1 are received by the T-shaped groove 102 of another first modular panel 1 to interlock the two first modular panels 1 in a face-to-face manner.

Figure 1A:
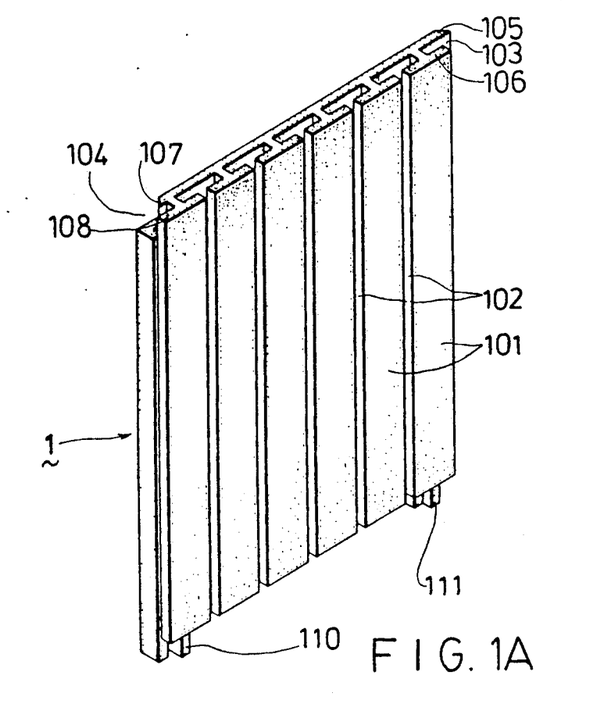
FIGS. 1A, 1B, 1C are perspective, front and rear views, respectively, of a first modular unit according to this invention.
Figure 1B:
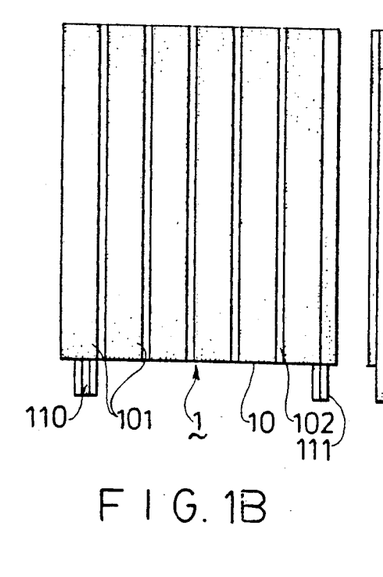
Figure 1C:
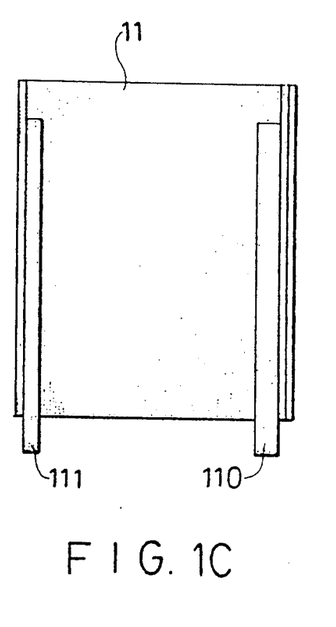
Figure 2:
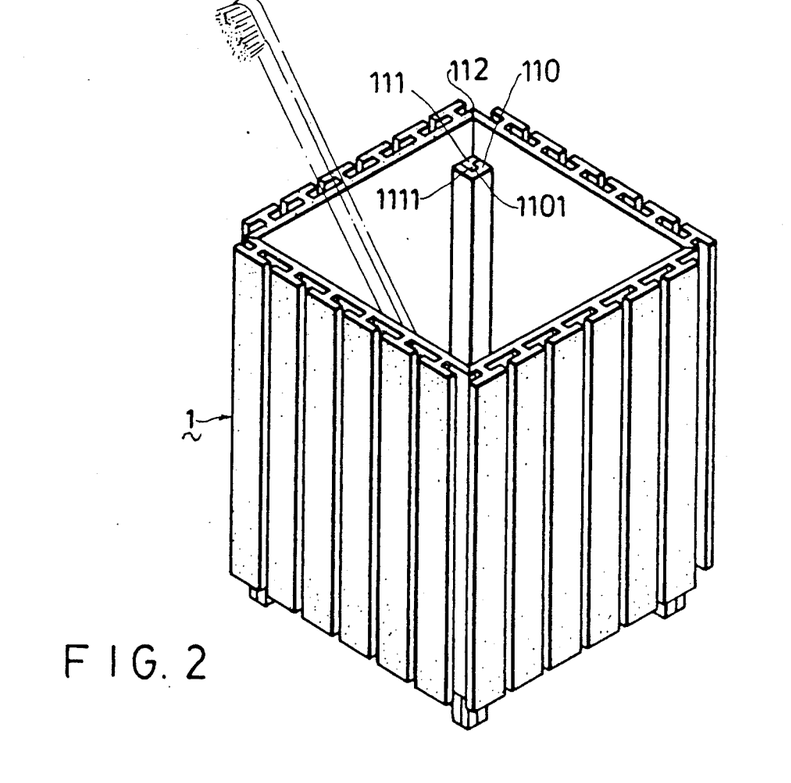
FIG. 2 is an illustration of an assembled rectangular hollow housing formed by using the first modular units of this invention.
Figure 5C:
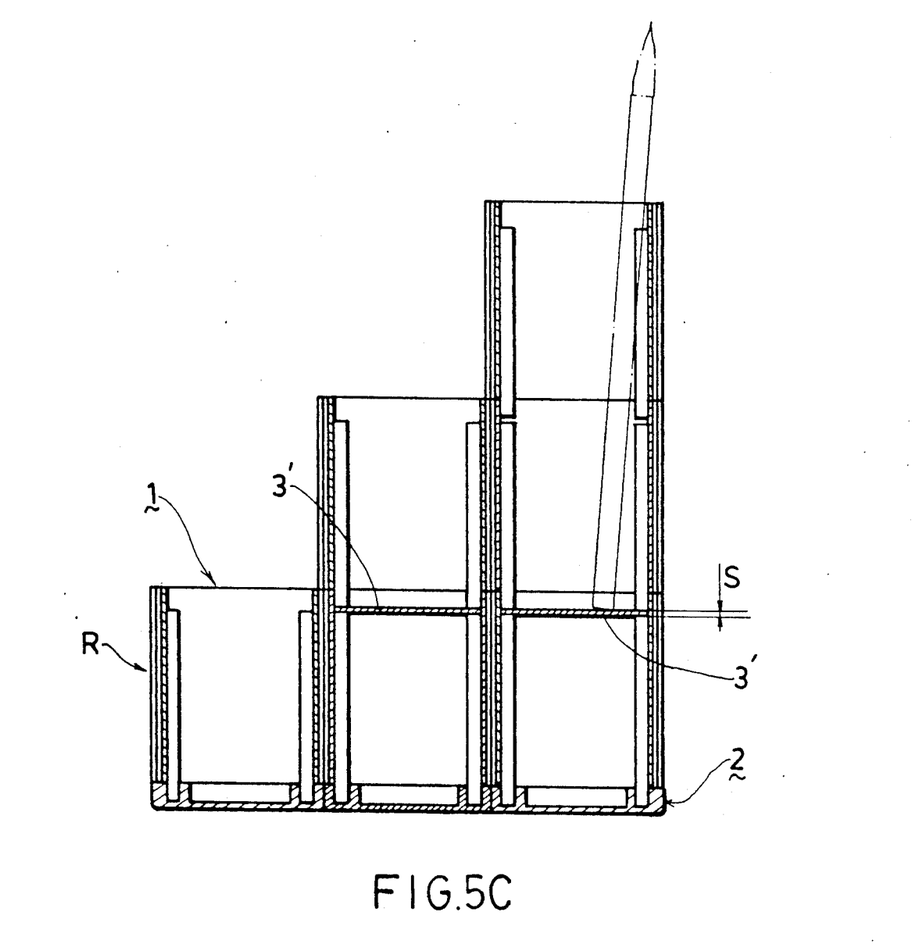
FIG. 5C is a sectional view of the stacked rectangular containers of FIG. 5A.

When the housing of FIG. 2 is stacked on top of a container R, as shown in FIG. 5C, a gap S is formed between the extreme top ends of the first and second connecting corner pieces 110, 111 of the container R and the extreme lower ends of the first and second connecting corner pieces 110, 111 of the housing of FIG. 2. A rectangular partition plate 3' of a thickness S is disposed between the extreme top ends and the extreme lower ends to separate the two bodies, as shown in this FIG..

Figure 7A:
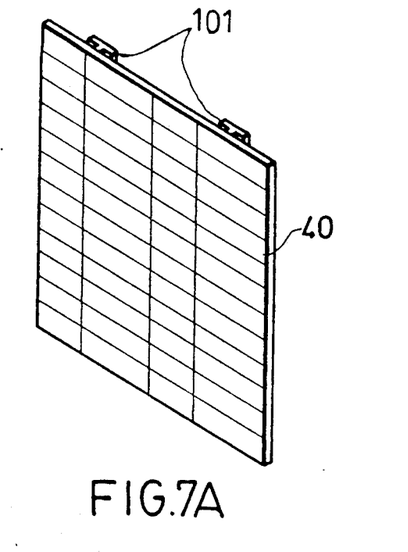
FIGS. 7A, 7B illustrate a fourth modular unit according to this invention.
Figure 7B:
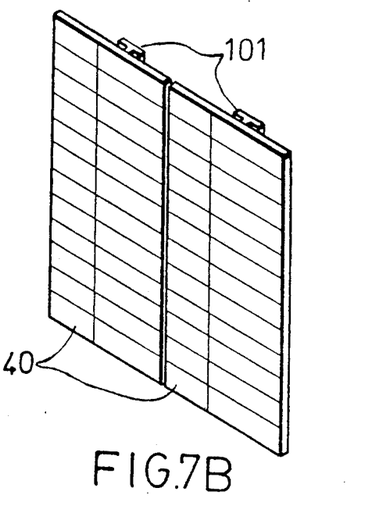
Figure 7C:
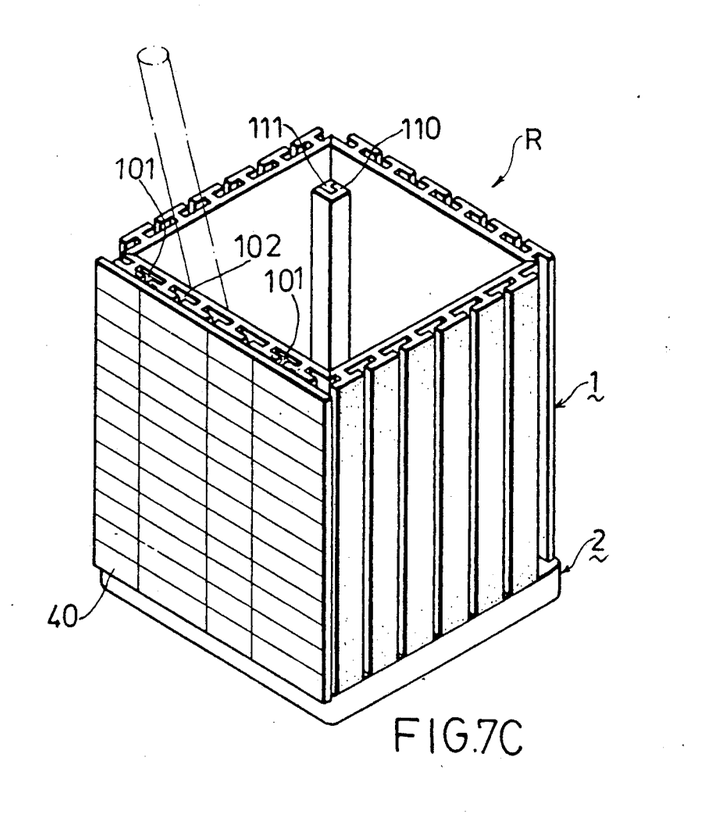
FIG. 7C llustrates the fourth modular unit of FIG. 7A attached to a rectangular container.

Fourth modular units 4 are shown in FIGS. 7A, 7B, 7C. The fourth modular unit 4 of FIG. 7A has calendar prints 40 found on a front face and can be made as a single plate with a pair of T-shaped protrusions 101 projecting from a rear face as shown in FIG. 7A, or as a pair of plates, each having a T-shaped protrusion 101 similarly projecting from a rear face, as shown in FIG. 7B. The fourth modular unit 4 can be attached to one of the first modular units 1 of the container R by engaging the T-shaped protrusion 101 of the fourth modular unit 4 with the T-shaped groove 102 of the first modular unit 1, as shown as shown in FIG. 7C.

Figure 8A:
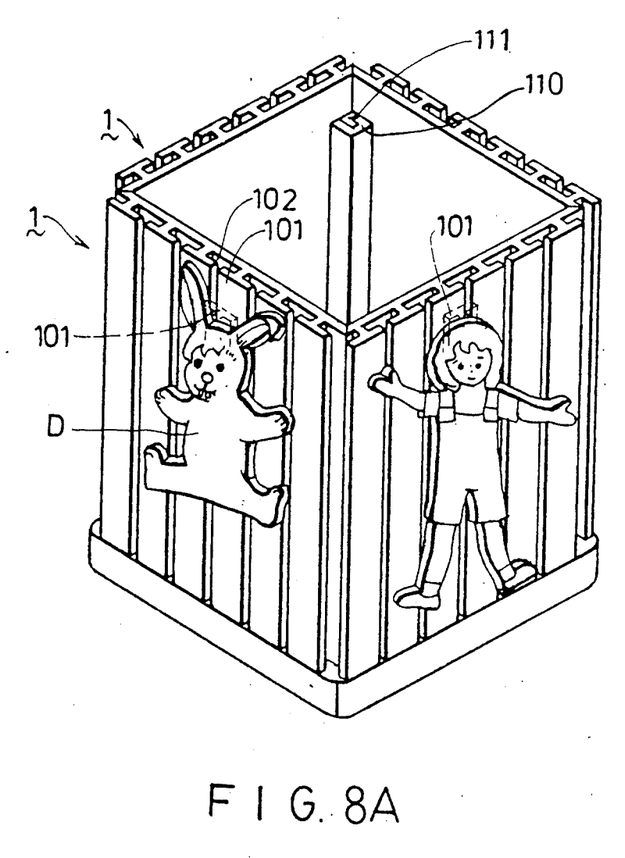
FIG. 8A illustrates a second preferred embodiment of a fourth modular unit according to this invention.

A method of increasing the aesthetic effect of the container R, as shown in FIG. 8A, is by using decorative figures D. Each of the decorative figures D has an irregular shape and T-shaped protrusions 101 projecting from a rear face for joining with a first modular unit 1.

Figure 8B:
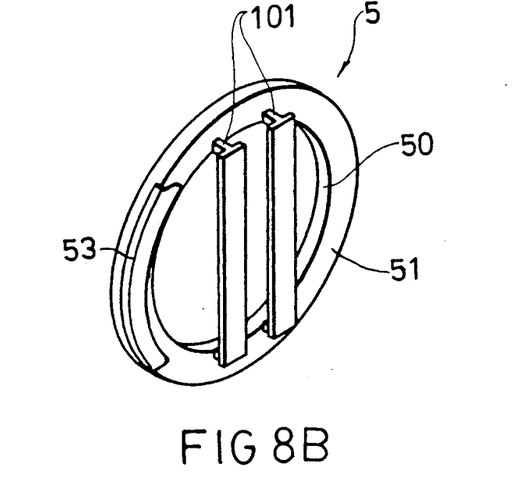
FIG. 8B is an illustration of a picture frame according to this invention.

A fifth modular unit 5 is shown in FIG. 8B. The modular unit 5 is a circular picture frame 51 with a central opening 50; a transparent cover may be provided thereat. Two pairs of longitudinal T-shaped protrusions 101 are used for joining the fifth modular unit 5 with a first modular unit 1. The fifth modular unit 5 further has a peripheral retaining member 53 projecting from a leftmost sector of the picture frame 51. A picture can be inserted between the picture frame 51 and the T-shaped protrusions 101 with one end of the picture held by the retaining member 53.

Figure 8C:
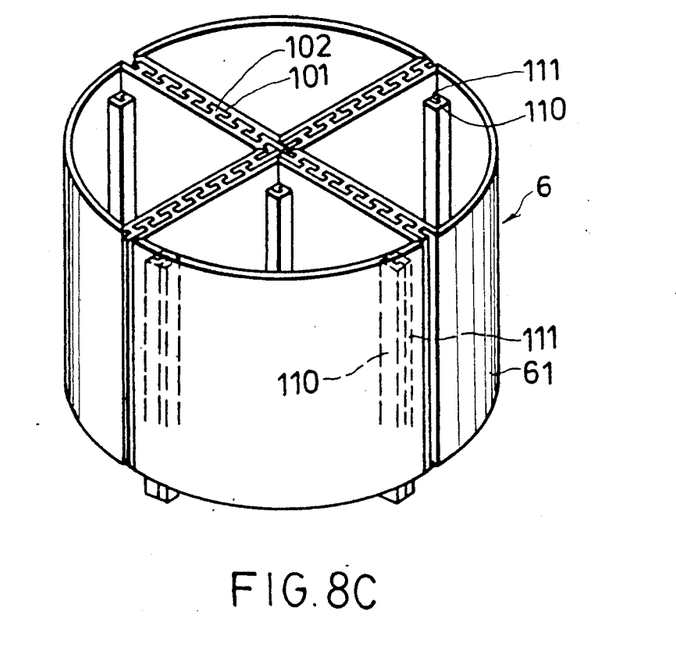
FIG. 8C is an illustration of a set of sixth modular units used in conjunction with a number of first modular units to form a cylindrical hollow container according to this invention.

A sixth modular unit 6 is shown in FIG. 8C, formed as a segmented cylindrical wall 61. The wall 61 has first and second connecting corner pieces 110, 111 disposed on a rear face. As shown in this FIG., eight first modular units 1 are connected to form a cross-shaped figure. Four sixth modular units 6 are each connected to a pair of adjacent first modular units 1 by means of the first and second connecting corner pieces 110, 111. The resulting structure is a cylindrical open container equally divided into four sections.

While the present invention has been described in connection with what are considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A modular panel assembly, comprising more than one first modular unit, each first modular unit having a plate member with a front face, a rear face, two oppositely disposed side faces connecting said front face to said rear face, and a bottom edge and a top edge; said rear face having a first connecting corner piece and a second connecting corner piece longitudinally and oppositely disposed near said side faces, said first connecting corner piece having a longitudinal groove, said second connecting corner piece having a longitudinal tongue, said first connecting corner piece of each of said first modular units being engageable with said second connecting corner piece of another said first modular unit; said first modular unit further having a plurality of substantially T-shaped protrusions projecting from said front face of said plate member and forming a plurality of substantially T-shaped grooves between them, each of said T-shaped protrusions having a pair of oppositely extending flange ends, each of said T-shaped grooves having a restricted opening between two said flange ends and being open at said to pand said bottom edges of said first modular units, said T-shaped protrusions of each of said first modular units being engageable with said T-shaped grooves of another said first modular unit; wherein each of said first modulat units has two longitudinal side grooves oppositely formed at said side faces and two pairs of flanks, each pair of said flanks defining one of said side grooves, one of said flanks in each pair being longer than the other said flank, one of said flanks in each pair being adjacent to said rear face and having an inclined edge face.

2. A modular panel assembly as claimed in claim 1, wherien each of said first and said second connecting corner pieces has an extreme lower end projecting downward from said bottom edge; wherein said first modular units are assembled to form a hollow housing of polygonal cross-section, said modular panel assembly further comprising a second modular unit having a closed bottom and a rectangular looped frame at a bottom of said hollow housing, said second modular unit further having corner sockets adjacent said looped frame to receive said extreme lower ends of said first and said second connecting corner pieces of said first modular units of said hollow housing.

3. A modular panel assembly as claimed in claim 2, further comprising a third modular unit to be received at a top end of said hollow housing, said third modular unit having a second looped frame with a plurality of intersecting partitioning members formed therein to form a plurality of access openings.

* * * * *